(12) United States Patent
Taratuta

(10) Patent No.: US 11,958,407 B2
(45) Date of Patent: Apr. 16, 2024

(54) APPARATUS TO PREVENT OR REDUCE EFFECT OF TEMPORARY BLINDING OF DRIVERS BY HEADLIGHTS OF ONCOMING VEHICLES

(71) Applicant: Leonid Taratuta, Milford, PA (US)

(72) Inventor: Leonid Taratuta, Milford, PA (US)

( * ) Notice: Subject to any disclaimer, the term of this patent is extended or adjusted under 35 U.S.C. 154(b) by 0 days.

(21) Appl. No.: 18/232,401

(22) Filed: Aug. 10, 2023

(65) Prior Publication Data

US 2024/0051462 A1    Feb. 15, 2024

Related U.S. Application Data

(60) Provisional application No. 63/397,720, filed on Aug. 12, 2022.

(51) Int. Cl.
*B60Q 3/72* (2017.01)
*B60Q 1/26* (2006.01)
*B60Q 3/51* (2017.01)

(52) U.S. Cl.
CPC .............. *B60Q 3/72* (2017.02); *B60Q 1/268* (2013.01); *B60Q 3/51* (2017.02); *B60Q 2300/056* (2013.01); *B60Q 2300/42* (2013.01)

(58) Field of Classification Search
CPC ... B60Q 3/72; B60Q 3/51; B60Q 3/59; B60Q 2300/056; B60Q 2300/42; B60Q 1/268
USPC ......................................... 362/488, 503, 397
See application file for complete search history.

(56) References Cited

U.S. PATENT DOCUMENTS

| | | | | |
|---|---|---|---|---|
| 2,084,252 | A * | 6/1937 | Hallenberg | B60Q 1/34 |
| | | | | 116/35 R |
| 2,675,534 | A * | 4/1954 | Bryant | B60Q 1/302 |
| | | | | 362/540 |
| 4,488,141 | A * | 12/1984 | Ohlenforst | B60Q 1/268 |
| | | | | 156/99 |
| 5,099,401 | A * | 3/1992 | Kondo | F21S 43/14 |
| | | | | 362/240 |
| 5,255,165 | A * | 10/1993 | Cail | B60Q 1/442 |
| | | | | 362/397 |
| 2004/0075537 | A1 * | 4/2004 | Quigley | B60Q 1/268 |
| | | | | 340/693.11 |
| 2010/0177524 | A1 * | 7/2010 | Svelander | B60Q 1/18 |
| | | | | 362/504 |

* cited by examiner

*Primary Examiner* — Laura K Tso
(74) *Attorney, Agent, or Firm* — Walter J. Tencza, Jr.

(57) ABSTRACT

An apparatus including a light housing; a first light fixed to the light housing; an attachment device configured to temporarily attach the light housing with the light to a front windshield of a vehicle; and wherein the first light is fixed to the light housing in a manner so that light from the first light is projected outwards from the light housing in a visual field of less than one hundred and eighty degrees. The attachment device, is configured to attach the light housing to the front windshield so that the visual field of the first light does not project into either of both eyes of a driver of the vehicle. The light housing may be substantially cylindrical and may have a flat surface, configured to be attached and to abut the front windshield. The apparatus may further include a first brightness setting mechanism attached to the light housing.

14 Claims, 16 Drawing Sheets

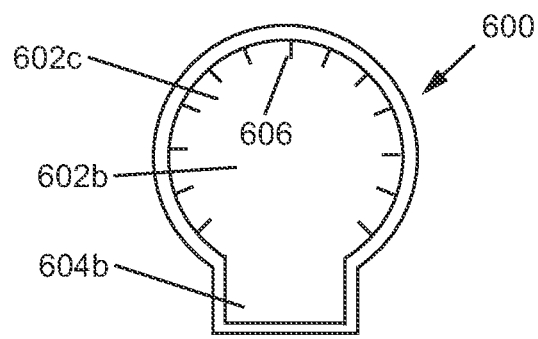
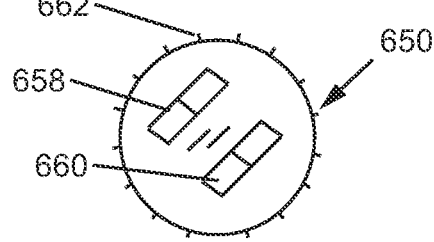
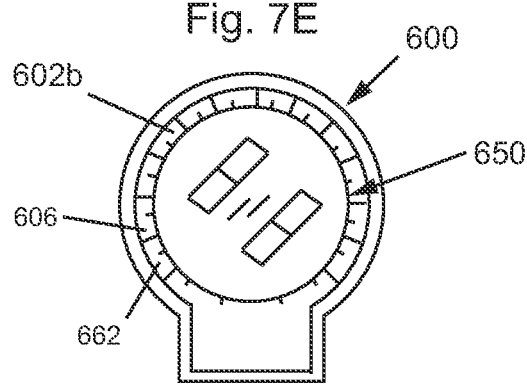

APPARATUS TO PREVENT OR REDUCE EFFECT OF TEMPORARY BLINDING OF DRIVERS BY HEADLIGHTS OF ONCOMING VEHICLES

CROSS REFERENCE TO RELATED APPLICATION(S)

The present application claims the priority of U.S. provisional patent application Ser. No. 63/397,720, filed Aug. 12, 2022, inventor and applicant Leonid Taratuta.

FIELD OF THE INVENTION

The present invention relates generally to devices and technologies make driving at night more comfortable and protects drivers from getting blinded by headlights of oncoming vehicles, such as automobiles or motorcycles.

BACKGROUND OF THE INVENTION

Temporary blindness can be caused by moving outgoing or even parked vehicles or motorcycles on the side of the road.

Blinding occurs due to the appearance of a large contrast between the surrounding night darkness outside the windows of the vehicles or motorcycles and powerful oncoming beams of photons that direct oncoming vehicles or motorcycles. Drivers' pupils dilate at night, and oncoming light rays hit them.

Blinding occurs due to some features of human vision. The fact is that the eye is an extremely sensitive organ, thanks to which you can see perfectly both on a dark night and in the sun on a fine winter day, such as between 0.0001 and 100,000 lux (lumens per square meter). The human eye is thus able to perceive degrees of light that differ from each other by a billion times.

Despite the versatility of human vision, it has a big drawback: when the brightness of the light changes dramatically, it takes a long time for the eyes to adjust to the new light level. Adaptation of the pupil to the new illumination takes from several tens of seconds to thirty seconds. With a sudden sharp change in lighting (bright light after dark, for example), the driver sees almost nothing. Therefore, blindness is extremely dangerous.

In order to reduce the number of traffic accidents at night and make night driving more comfortable, it is necessary to improve visibility on the road and reduce the frequency of blinding drivers, because as a result, control over the situation on the road is almost completely lost.

Temporary blindness caused by headlights of oncoming traffic has been a serious problem for a long time. Studies show that average time for "temporary" blinding caused by headlight roughly 2.5 seconds. For this period of time vehicles with an average speed of fifty miles/hour can drive almost one hundred and eighty feet or one half of a football field. When a driver is blinded by oncoming lights, the driver will not be able to observe oncoming traffic, road, and pedestrians, and this can cause serious problems or crashes.

This problem is getting even worse with the latest headlights based on the latest high-intensity discharge (HID) lights or LED (light emitting diode) technologies. Even low beam headlights with HID or LED or other different types of bulbs may blind drivers.

There have been many attempts to solve this problem. There are two major groups of prior applications to address this issue. Some are more passive, and some are active.

One of them is related to protective tint film permanently attached to the front windshield. A second known technique is wearing sun or hunter's glasses during a ride in the dark.

The other main group of attempts to solve this problem related to adjustable headlight beams.

Unfortunately, none of these known options satisfactorily solve this problem. Protective tint film is located above the main field of view of the driver and although it can help from sun light from above it doesn't help at night. Dark glasses are darkening a vision of the driver in an already dark environment.

Adjustable headlight beams have serious delays for changing beams off especially on curvy roads. Switching from high to low beam headlights does not solve the problem especially with new HID and LED lights.

Headlamp glare reduces visibility by creating a "veil" of scattered light over the visual scene inside the eye. Glare also increases discomfort to drivers, which might be related to poorer steering control, lane-keeping, and speed control. It also increases fatigue, tiredness of the driver. Visual adaptation effect has large safety implications. Whenever a person transitions from a brightly lit or very dark environment to one of very different luminance, there is a large visual loss. Elderly people and people with any eye problems like—glasses or lenses exhibit impaired abilities and suffer the largest visual loss due to abrupt light changes.

There is a need of an apparatus and technology that creates smooth transitions from light to dark. This smoother transition minimizes adaptation effects and permits better vision.

There is a need in the industry for a device that will reduce the effect of blinding by headlights of oncoming vehicles or motorcycles, improve visibility, and reduce the light load on a driver's eyes. There is a need to reduce fatigue and tiredness of drivers due to blinding light of oncoming vehicles.

SUMMARY OF THE INVENTION

One or more embodiments of the present invention help to reduce the negative and dangerous effect of temporary blindness caused by bright automobile and motorcycle headlights.

One or more embodiments of the present invention help to decrease the time that a driver's eyes adapt to changes in light level during night driving and makes night driving much more comfortable.

In at least one embodiment, an apparatus is provided comprising: a light housing; a first light fixed to the light housing; an attachment device configured to temporarily attach the light housing with the light to a front windshield of a vehicle; and wherein the first light is fixed to the light housing in a manner so that light from the first light is projected outwards from the light housing in a visual field of less than one hundred and eighty degrees; and wherein the attachment device, is configured to attach the light housing to the front windshield so that the visual field of the first light does not project into either of both eyes of a driver of the vehicle.

The light housing may be substantially cylindrical. The light housing may have a flat surface, configured to be attached and to abut the front windshield.

The apparatus may further include a first mechanism attached to the light housing which is configured to set the brightness of the first light. The apparatus may further include a second mechanism attached to the light housing which is configured to turn the first light off and on.

The attachment device may include a holder into which the housing with the first light are configured to be inserted.

The holder may be configured to mesh with the light housing so that when the light housing with the first light is inserted into the holder, and the first light is on, the first light projects outwards from the holder in a fixed direction with respect to the holder, wherein the fixed direction cannot be changed without removing the light housing with the first light from the holder or breaking the light housing, the first light, or the holder.

The holder may have a plurality of protrusions; and the light housing may have a plurality of protrusions which mesh with the plurality of protrusions of the holder in order to maintain the housing at a fixed orientation with respect to the holder while the light housing with the first light is in the holder.

The apparatus may be further comprised of a second light attached to the light housing; and a third light attached to the light housing; and wherein each of the first, second, and third lights project light outwards from the light housing in substantially the same visual field.

The attachment device may include a pivot pin which connects the attachment device to the light housing, so that the light housing is configured to pivot with respect to the attachment device, when the attachment device is attached to the front windshield of the vehicle.

A method is provided in at least one embodiment, which may include temporarily attaching a light housing to a front windshield of a vehicle using an attachment device; and wherein a first light is fixed to the light housing; wherein the first light is fixed to the light housing in a manner so that light from the first light is projected outwards from the light housing in a visual field of less than one hundred and eighty degrees; and wherein the attachment device, is configured to attach the light housing to the front windshield so that the visual field of the first light does not project into either of both eyes of a driver of the vehicle.

The light housing may be configured as previously described. A first and a second mechanism may be provided as previously described.

The attachment device may be configured as previously described. The holder may be configured to mesh with the light housing as previously described.

Second and third lights may be attached to the light housing as previously described.

The attachment device for use with the method, may include a pivot pin which connects the attachment device to the light housing, so that the light housing is configured to pivot with respect to the attachment device, when the attachment device is attached to the front windshield of the vehicle.

BRIEF DESCRIPTION OF THE DRAWINGS

FIG. 7C shows a front view of the holder of FIG. 7A;

FIG. 7D shows a front view of the light or lighting mechanism of FIG. 7B;

FIG. 7E shows a front view of the light or lighting mechanism of FIG. 7B inserted into the holder of FIG. 7A;

FIG. 8A shows an apparatus including a device configured to attach to a front windshield, which is attached to an arcuate track, through which a light and/or combination light and holder, such as the first device of FIG. 1A, the second device of FIG. 2A, and/or the devices of FIGS. 5A-E, 6A-E, and/or 7A-E, is able to rotate, pivot, and/or swivel, and/or move up and down inside the holder, with respect to the device configured to attach to the front windshield, wherein FIG. 8A shows the light and holder at a first orientation with respect to the device configured to attached to the front windshield;

FIG. 8B shows the apparatus of FIG. 8A wherein FIG. 8B shows the light and holder at a second orientation with respect to the device configured to attached to the front windshield; and a column, frame or structural member immediately abutting and/or adjacent to the front windshield on the driver's side in accordance with an embodiment of the present invention from the perspective view of a driver looking out of a front windshield.

DETAILED DESCRIPTION OF THE DRAWINGS

Figure 1A:
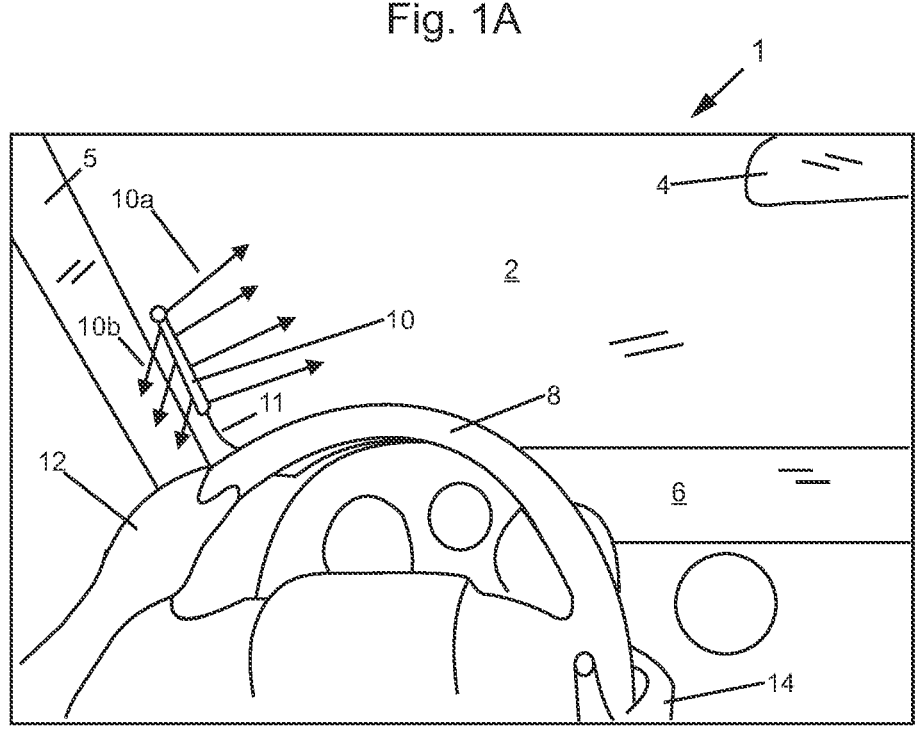
FIG. 1A shows a simplified diagram of a part of an interior of part of a known automobile, along with two hands on a steering wheel, and a device in accordance with an embodiment of the present invention from the perspective view of a driver looking out of a front windshield.
Figure 1B:
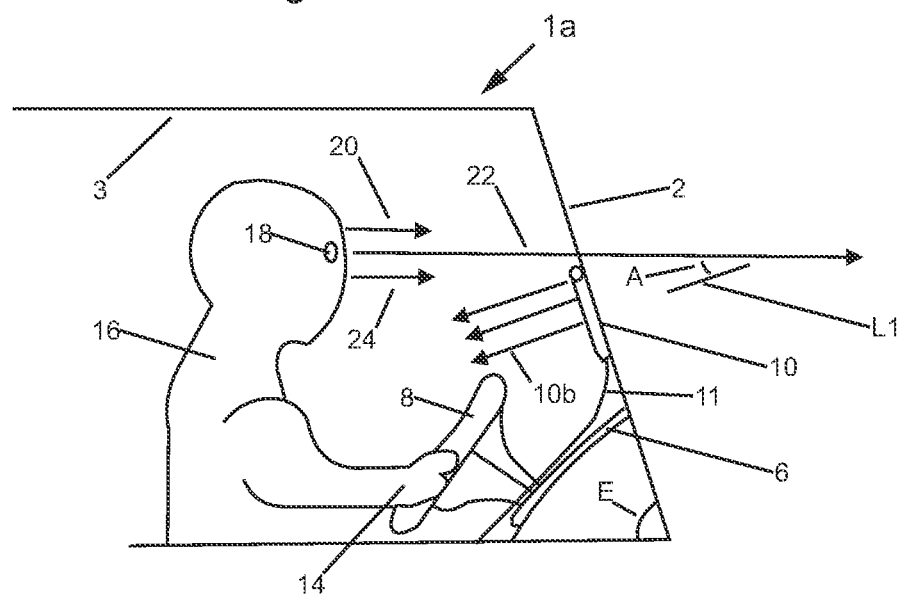
FIG. 1B shows a simplified diagram of a part of the known automobile, with one of the two hands of FIG. 1A visible on the steering wheel, and with the device in accordance with the embodiment of FIG. 1A, from a side perspective view.

FIG. 1A shows a simplified diagram of a part 1 of a known automobile, along with two hands 12 and 14 of a human being driver on, gripping, and/or grasping a steering wheel 8, and a device 10 in accordance with an embodiment of the present invention from the perspective view of the human being driver 16, shown in FIG. 1B, looking out of a front windshield 2 from the interior of the known automobile.

The part 1 of the interior of a known vehicle further includes a known rearview mirror 4, and a known dashboard 6.

The device 10 emits a first plurality of light rays 10a, which are approximately in the same direction towards the upper right hand corner of the part 1 of the automobile. The device 10 also simultaneously emits a second plurality of light rays 10b, which are approximately in the same direction towards the lower left hand corer of the part 1 of the automobile.

FIG. 1B shows a simplified diagram of a part 1a of the same known automobile as in FIG. 1A, with hand 14 of the two hands of FIG. 1A, visible on, gripping, and/or grasping the steering wheel 8, and with the device 10 in accordance with the embodiment of FIG. 1A, from a side perspective view. FIG. 1B shows human being driver 16, and an eye 18 of the human being driver focused towards the front windshield 2. A direction arrow 22 shows a line of sight from the eye 18 of the human being driver towards the front windshield 2. Direction arrows 20 and 24 are in an identical or similar direction as direction arrow 22.

The line of sight direction arrow 22 makes an angle A with respect to a line L1, which is parallel to the light emission lines 10b, and which is caused by the tilt of front windshield 2. Angle A is the angle between the car horizontal and the front windshield 2.

The device 10 may be electrically connected to a vehicle power supply through an electrical conductor and/or cable 11 shown in FIG. 1A and/or FIG. 1B, and/or the device 10 may include batteries for providing power to device 10 to activate lights on device 10.

Referring to FIGS. 1A-1B, in operation the device 10 is activated so that plurality of light rays 10a and plurality of light rays 10b are emitted. The light rays 10a and 10b are emitted to provide a consistent lighting environment for a driver 16, so that the driver 16 is not exposed to drastic changes in lighting when looking forward in the line of sight direction 22 towards and out the front windshield 2.

In at least one embodiment, the device 10 emits light rays 10a and 10b, consistently and typically all the time, when a driver 16 is driving the vehicle parts 1 and 1a of which are shown in FIGS. 1A and 1B, respectively.

As device 10 is emitting light all the time during night driving, the device 10 doesn't have any delays to turn on and off in comparison with adaptive headlights systems.

It is not required to wear any special dark glasses and the device 10 never darkens a driver's view.

The device 10, as configured on or in the automobile, part of which is shown in FIGS. 1A and 1B, helps to create the correct and comfortable illumination of the driver's field of vision.

The device 10, as configured provides eye-relaxing background lighting.

The device 10 as configured helps to adjust the person 16's eyes and pupils of the person's eyes to changes that occur on the road. As a result, the effect of blinding by headlights of oncoming vehicles or motorcycles is reduced, visibility is improved, and the load on the driver's eyes is reduced.

In at least one embodiment, the device 10 preferably emits blue color light for light rays 10a and 10b and in one embodiment this is critical and it provides decreased production of sleep hormones and thereby decreases fatigue, tiredness, and improves response of the driver.

Figure 2A:
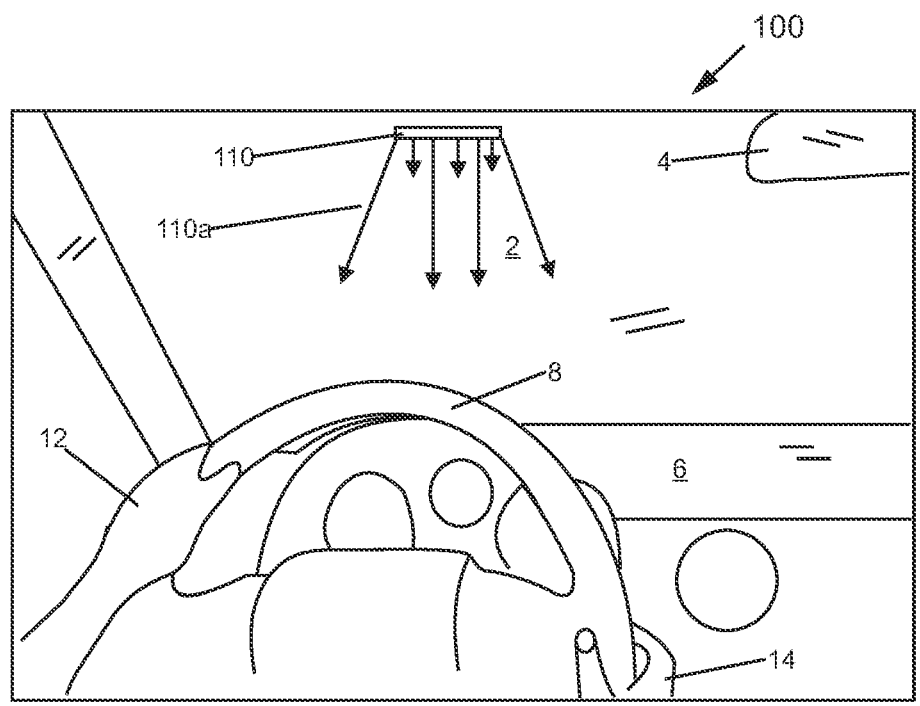
FIG. 2A shows a simplified diagram of a part of an interior of part of a known automobile, along with two hands on a steering wheel, and a second device in accordance with an embodiment of the present invention from the perspective view of a driver looking out of a front windshield.

FIG. 2A shows a simplified diagram of a part of an interior of part 100 of a known automobile, along with two hands on the steering wheel 8, and a second device 110 in accordance with an embodiment of the present invention from the perspective view of a driver 16 looking out of a front windshield 2. FIG. 2A may be the same as FIG. 1A, except for the use of second device 110 instead of first device 10. In at least one embodiment, the second device 110 may be the same as the first device 10, except for where the second device 110 is located on the front windshield 2 versus where the first device 10 is located on the front windshield 2.

Figure 2B:
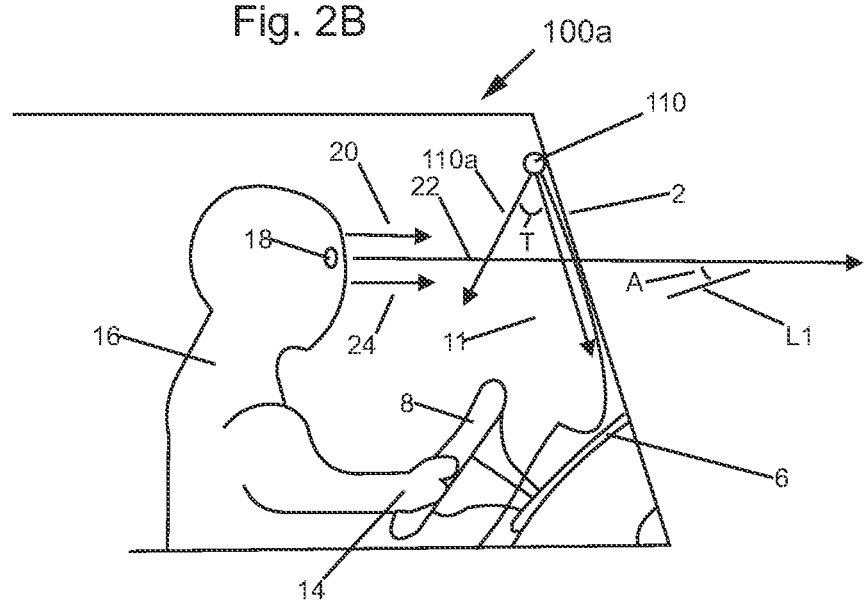
FIG. 2B shows a simplified diagram of a part of the known automobile, with one of the two hands of FIG. 2A visible on the steering wheel, and with the second device in accordance with the embodiment of FIG. 2A, from a side perspective view.

FIG. 2B shows a simplified diagram of a part 100a of the known automobile, with one hand 14 of the two hands 12 and 14 of FIG. 2A visible on the steering wheel 8, and with the second device 110 in accordance with the embodiment of FIG. 2A, from a side perspective view.

Figure 3:
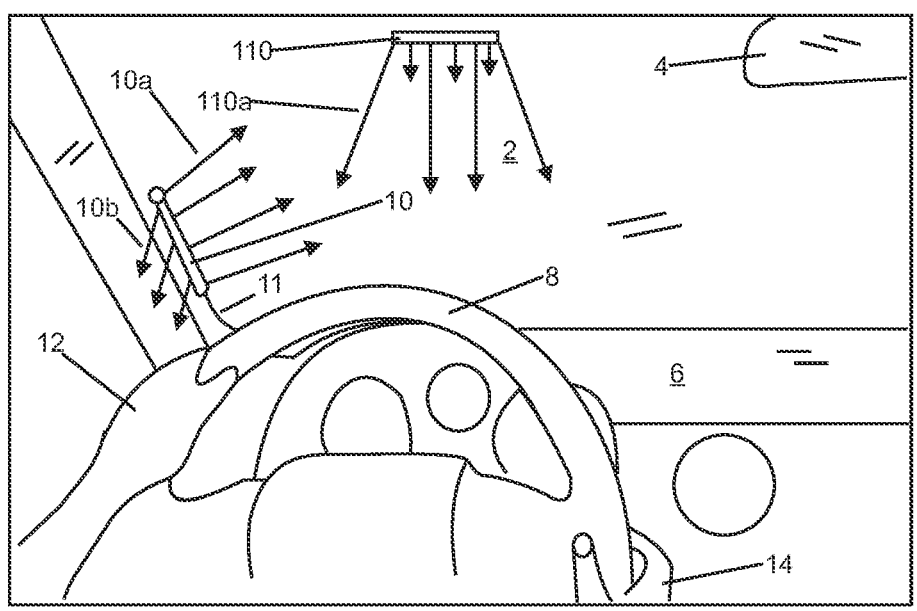
FIG. 3 shows a simplified diagram of a part of an interior of part of a known automobile, along with two hands on a steering wheel, and the first device of FIG. 1A and the second device of FIG. 2A in accordance with an embodiment of the present invention from the perspective view of a driver looking out of a front windshield.

FIG. 3 shows a simplified diagram of a part of an interior of part of a known automobile, along with two hands on a steering wheel 8, and the first device 10 of FIG. 1A and the second device 110 of FIG. 2A in accordance with an embodiment of the present invention from the perspective view of the driver 16 looking out of the front windshield 2.

The devices 10 and/or 110 are preferably properly located between the very left side of the windshield immediately adjacent to frame, column, member or beam 5 and the steering wheel 8, shown in FIG. 1A. This is determined based on the distance allowed by law, and so that devices 10 or 110 are not blocking a driver's view.

The devices 10 and/or 110 preferably emit a blue or green color, which is shown to be less harsh on the eyes. It is critical that the devices 10 and/or 110 be located on the windshield 2, so that the devices 10 and/or 110 do not shine light or any substantial light, directly into a driver's eyes.

The devices 10 and/or 110 can significantly reduce the effect of blinding by headlights of oncoming vehicles, improve visibility, and reduce the light load on a driver's eyes.

The devices 10 and/or 110 are mounted on the inside of the windshield 2 of an automobile in such a way that at least some of the light rays, such as light rays 10a and 110a are directed parallel to the glass of the front windshield 2. This creates illumination for the driver's eyes but light rays are not emitted directly to the driver's eye or eyes, such as to eye 18 of driver 16 in FIGS. 1B and 2B. To position the devices 10 and/or 110, such that light rays are parallel to the glass of the front windshield 2 also helps to avoid creating a glare on the front windshield 2 of an automobile, or a front windshield of a motorcycle.

In one or more embodiments, the devices 10 and/or 110 are configured to be powered by any type of batteries or accumulators, re-chargeable batteries or accumulators or can be directly connected to a vehicle's or motorcycle's power supply or both. The devices 10 and/or 110 can be done as an attachment to existing vehicles, motorcycles or can be incorporated in the vehicle by its manufacturers.

The devices 10 and/or 110 can have many different sources of light from light emitting diodes (LEDs) to incandescent lamps.

The devices 10 and/or 110 can be made from any material known in the industry.

The devices 10 and/or 110 can be directly attached to vehicle's or motorcycle's front windshield, such as front windshield 2 or to a holder that attaches to the vehicle's front windshield 2 and the devices 10 and/or 110 can go into a holder, as will be described.

The level of brightness of the devices 10 and/or 110 can be changeable or permanent. However, it is important that the level of brightness provides a comfortable level for driver's eyes and never points light rays directly into the driver's eyes.

The devices 10 and/or 110, in at least one embodiment, are configured to be attached, so light rays, such as light rays 10a and 110a are parallel to the front windshield 2 of the vehicle, automobile, or motorcycle. Each of the devices 10 and/or 110 may have one, two or more light sources that emit light. The device 10 in FIG. 1A is preferably located on the far-left side of the front windshield 2, as shown in FIG. 1A, for an automobile having steering wheel 8 on the left side of the automobile, as typically occurs in the United States. However, for vehicles, such as typically driven in the United Kingdom, the device 10 is preferably located on the far-right side of the front windshield 2, where the steering wheel is on the right side of the automobile. It is critical, in at least one embodiment, that the devices 10 and/or 110 are attached to the front windshield 2 or incorporated into the body of the vehicle in a way that light never shines directly into driver eyes.

In at least one embodiment, the strength, intensity, and/or brightness of the light emitted from devices 10 and/or 110 is typically on a low side and configured to be adjustable that makes it more of a background, supporting light.

As the devices 10 and/or 110, in at least one embodiment, is typically installed parallel to the front windshield 2, the devices 10 and/or 110 should never reflect on the front window and/or front windshield 2, and create a glare, which would make it difficult to see. In addition, the use of a blue or green light filter in the device 10 and/or 110 makes it possible to better control the situation on the road, since at night the human eye is most sensitive to blue and green rays of the visible spectrum. This is because the sensitivity of the photoreceptors of human eyes during dark adaptation is shifted to the blue and green parts of the spectrum. The devices 10 and/or 110 may have blue, green, a mix of blue and green or other color lights or light filters as well. However, it is preferred that there be a mix of blue and green lights, since the human eye is most sensitive to blue and green rays of the visible spectrum and therefore blue and green lights help to keep someone awake and/or alert while driving.

When a human driver, such as driver 16, drives a car, which includes parts 1 and 1a of FIGS. 1A and 1B, and it is getting dark or already dark, the driver 16 should turn the devices 10 and/or 110 on. In at least one embodiment, when the devices 10 and/or 110 are turned on, they will produce smooth, background light, wherein the brightness is typically configured to be adjusted from, for example, zero to three hundred or from zero to four hundred and fifty lumens. It is highly recommended that the devices 10 and/or 110 should be installed in such way that angle A, shown in FIG. 1B should not be less than several degrees and angle E, shown in FIG. 1B (the front windshield 2 angle to the horizontal of the vehicle) should be always less than 90 degrees. This will make sure that light from the devices 10 and/or 110 do not go straight into the driver's eyes, such as into eye 18.

Once the trip is ended device 10 and/or 110 should be turned off. There is typically no need to use the device 10 and/or 110 during the daytime, unless for example, there is a very cloudy day. The devices 10 and/or 110 are generally in use during night time hours.

The lights from the devices 10 and/or 110 may create a little background illumination on the front windshield 2. The device 10 in FIG. 1B creates light rays 10b which go below the driver eye gaze direction or line of sight 22.

The devices 10 and/or 110 always must be installed in a way that never interferes with a driver's line of sight 22 and can never even partially block the line of sight 22.

As shown in FIGS. 2A and 2B, the device 110 may be located above the driver's line of sight on the top of front windshield 2. It is recommended to install the device 110 in the example of FIGS. 2A and 2B, in such way that angle T, shown in FIG. 2B, is 60 degrees or less. It prevents lights from the device 110 from shining directly into the driver's eyes, such as including eye 18.

As it is shown in FIG. 3, multiple devices 10 and 110 may be used for the driver's protection.

In generally, glare caused by oncoming headlamps of oncoming vehicles reduces visibility for a driver, such as driver 16, by creating a "veil" of scattered light over the visual scene inside the eye, such as eye 18 of FIG. 2B. The present invention in one or more embodiments, helps to reduce the negative impact on the eyes and make driving at night and/or in the dark, or under cloudy conditions, much more comfortable.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

Figure 4:
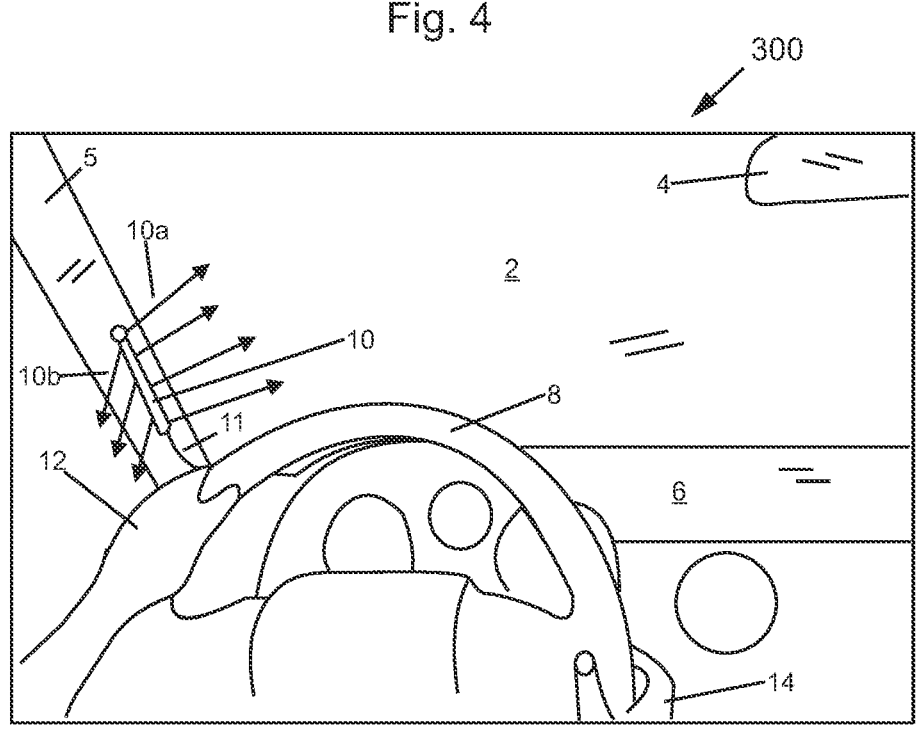
FIG. 4 shows a simplified diagram of a part of an interior of part of a known automobile, along with two hands on a steering wheel, and the first device of FIG. 1A, with the first device of FIG. 1A attached to a column, frame or structural member immediately abutting and/or adjacent to the front windshield on the driver's side in accordance with an embodiment of the present invention from the perspective view of a driver looking out of a front windshield.

FIG. 4 shows a simplified diagram 300 of a part of an interior of part of a known automobile, along with two hands 12 and 14 on a steering wheel 8, and the first device 10 of FIG. 1A, with the first device 10 of FIG. 1A attached to a column, frame or structural member 5 immediately abutting and/or adjacent to the front windshield 2 on the driver's side in accordance with an embodiment of the present invention from the perspective view of a driver looking out of a front windshield 2. FIG. 4 may be identical to FIG. 1A, with the exception that the device 10 is configured to removably attach to the column 5, instead of directly to the front windshield. The device 10 may be removably attached by velcro (trademarked), hooks and/or loops, sticky tape or adhesive, or suction cups which may be part of the device 10, and generally the devices 10 and/or 110 may be removably attached in any of these ways or any known way, for configuration shown in FIGS. 1A, 2A, 3, and 4.

Figure 5A:
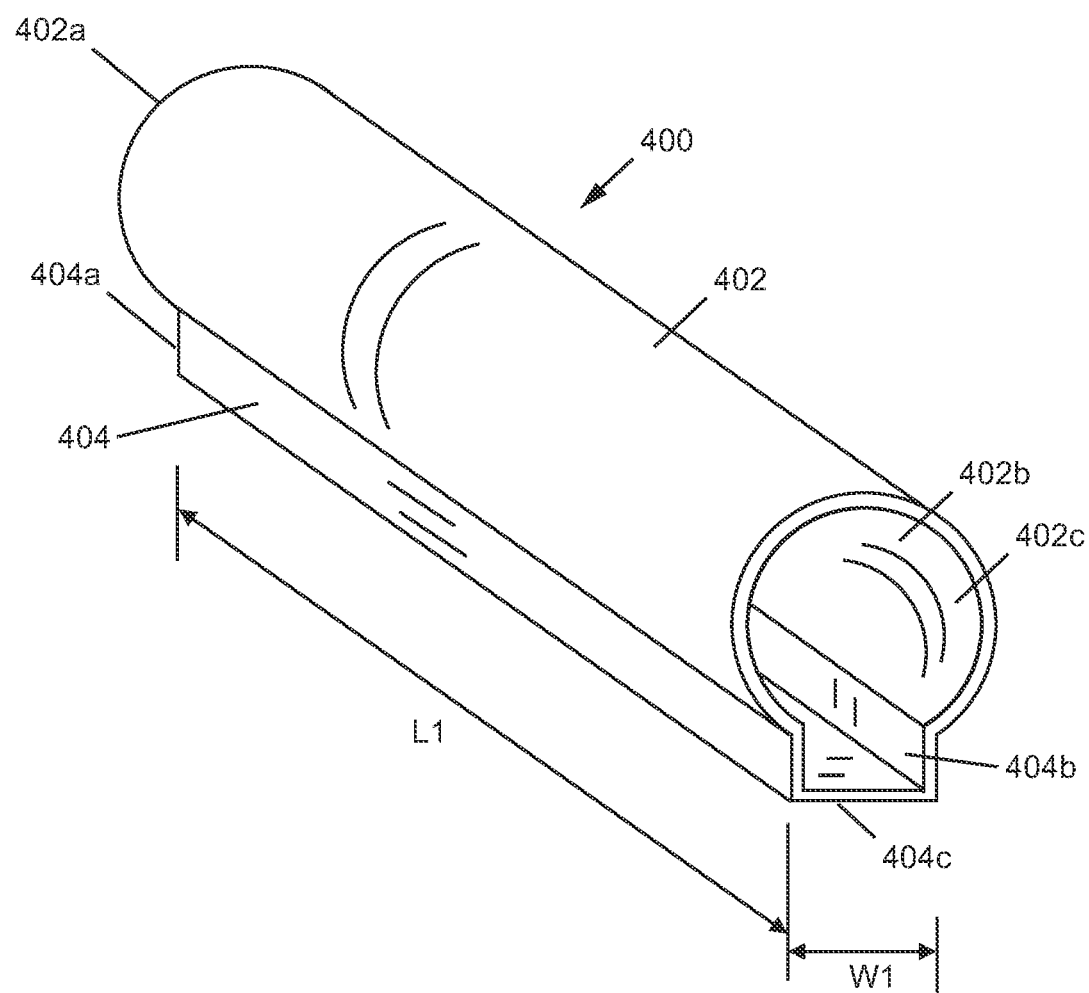
FIG. 5A shows a front, left, and top perspective view of a holder for the first device of FIG. 1A, the second device of FIG. 2A, or a similar or identical device, in accordance with an embodiment of the present invention.

FIG. 5A shows a front, left, and top perspective view of a holder 400 for the first device 10 of FIG. 1A, the second device 110 of FIG. 2A, or a similar or identical device, in accordance with an embodiment of the present invention.

The holder 400 may include a cylinder portion 402, which has a closed end 402a, and an opposite open end 402b. The open end 402b leads to an inner chamber 402c which typically runs the length L1 or substantially that length of the holder 400. The holder 400 also preferably includes a protruding rectangular prism section 404 having a closed end 404a and an opposite open end 404b, which leads to the inner chamber 402c. The inner chamber 402c may be described as including both the hollow cylindrical portion and the hollow rectangular prism portion.

The protrusion 404 has a flat bottom surface 404c, for contacting and being attached to the front windshield 2 of FIG. 1A. The flat bottom surface 404c may be removably attached to the front windshield, along the entire length L1 of the holder 400, or substantially the entire length, by glue, adhesive, tape, suction cups, or in any other known manner. The holder 400 is preferably oriented and attached to the front windshield in a manner so that the lght or light mechanism 450 shown in FIG. 5B does not fall out of the holder 400. Typically this means that the opening 402b should be higher than the closed end 402a. The holder has a width W1, which should be substantial enough to hold the holder 400 and inserted light 450 to the windshield 2, but not too great that a view is obstructed. A length L1 of 1.0-5.0 inches and a width W1 of 0.25-1.0 inch are preferred in at least one embodiment.

Figure 5B:
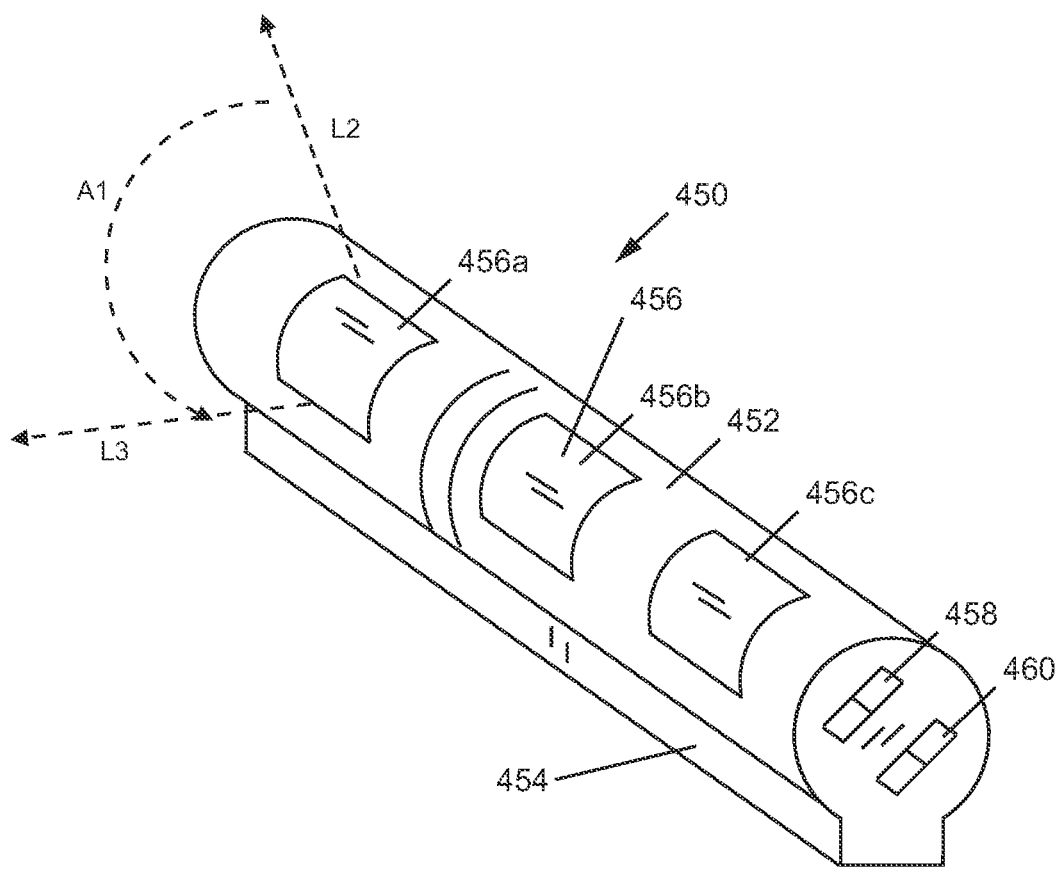
FIG. 5B, shows a front, left, and top perspective view of a light or light mechanism for insertion into the holder of FIG. 5A.

FIG. 5B, shows a front, left, and top perspective view of a light or light mechanism 450 for insertion into the holder 400 of FIG. 5A. The light mechanism 450 includes one or more lights, such as a plurality of lights 456, including light 456a, 456b, and 456c. The light mechanism 450 includes a cylindrical or substantially cylindrical portion or light housing 452, and a rectangular prism portion 454, both of which are typically solid or substantially solid. The light mechanism 450 further includes a switch and/or mechanism 458 for setting brightness and turning the lights 456a, 456b, 456c on and off, and a switch and/or mechanism 460 for switching to one or multicolor lights. The light 456a may emit blue light. The light 456b may emit green light. The light 456c may emit white light. The switch or mechanism 460 may toggle through various light settings, such as any one, two or three, of lights 456a-c on while the others may be off.

Figure 5C:
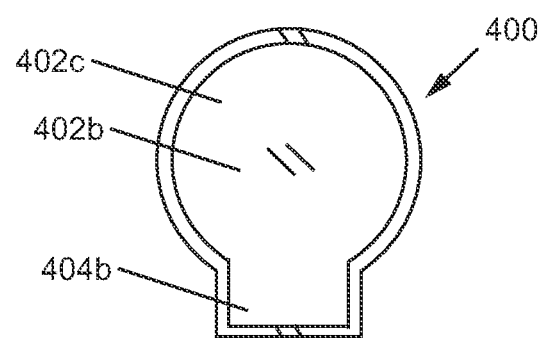
FIG. 5C shows a front view of the holder of FIG. 5A.

FIG. 5C shows a front view of the holder 400 of FIG. 5A.

Figure 5D:
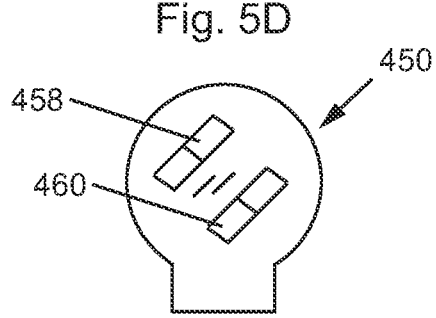
FIG. 5D shows a front view of the light or lighting mechanism of FIG. 5B.

FIG. 5D shows a front view of the light or lighting mechanism 450 of FIG. 5B.

Figure 5E:
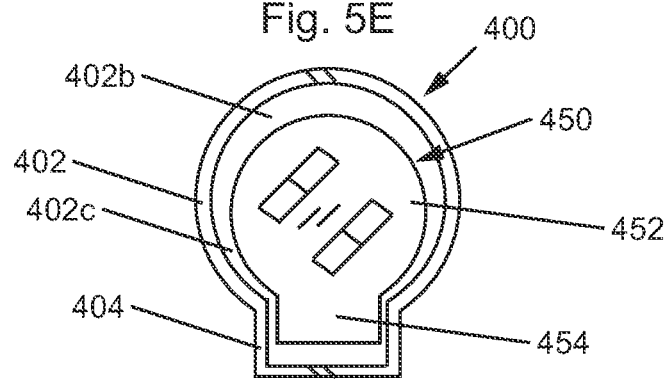
FIG. 5E shows a front view of the light or lighting mechanism of FIG. 5B inserted into the holder of FIG. 5A.

FIG. 5E shows a front view of the light or lighting mechanism 450 of FIG. 5B inserted into the holder 400 of FIG. 5A. The cylinder portion 452 and the rectangular portion 454 of the lighting mechanism 450 is configured to mesh within the hollow inner cylinder chamber of inner chamber 402c, and the hollow inner rectangular chamber of inner chamber 402c, preferably for the entire or substantially the entire length L1 of the holder 400, and the rectangular protrusion 454 maintains the light mechanism 450 in a specific orientation with respect to the holder 400, and therefore with respect to the windshield 2 when the holder 400 is attached to the windshield 2, as for device 10 in FIG. 1A and device 110 in FIG. 2A. Note that the lighting mechanism 450 is inserted into the holder 400, so that the switches 458 and 460 are accessible through the opening 402b.

In FIG. 5B, the light 456a (and also the lights 456b, and 456c), preferably project light directly in a region between lines L2 and L3, and do not project light in any other direction and/or do not substantially project light in any other direction. The lines L2 and L3 preferably make an angle of A1, which preferably is between 15 and 175 degrees. The region between lines L2 and L3 may be referred to as a "visual field" of projection of light from the light 456a. The lights 456a, 456b, and 456c may project light out in the same "visual field" or substantially the same visual field. The lighting mechanism 450 and the lights 456a, 456b, and 456c, are thus configured to project light in a specific direction, which when attached to the front windshield 2, is not directly in the eyes of a driver.

Figure 6A:
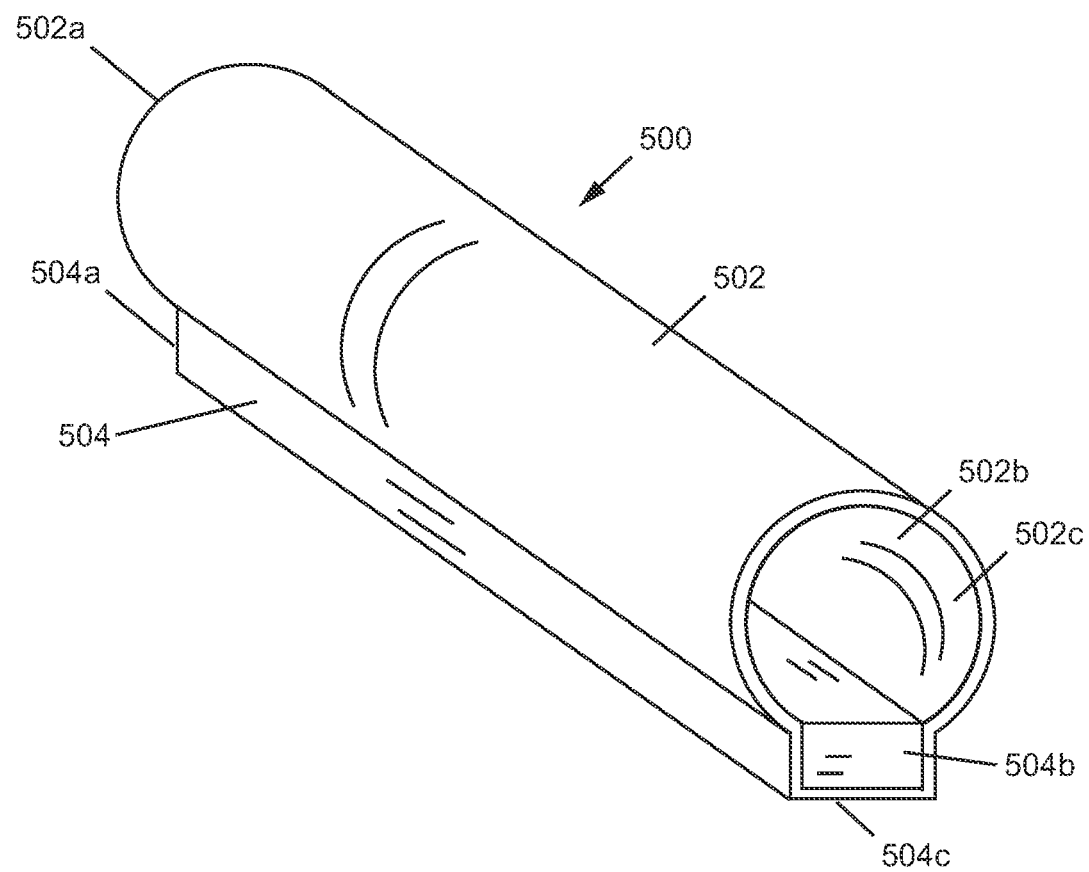
FIG. 6A shows a front, left, and top perspective view of another holder for the first device of FIG. 1A, the second device of FIG. 2A, or a similar or identical device, in accordance with an embodiment of the present invention.

FIG. 6A shows a front, left, and top perspective view of a holder 500 for use with the first device 10 of FIG. 1A, the second device 110 of FIG. 2A, or a similar or identical device, in accordance with an embodiment of the present invention.

The holder 500 may include a cylinder portion 502, which has a closed end 502a, and an opposite open end 502b. The open end 502b leads to an inner chamber 502c which typically runs the length L1 (analogous to L1 shown in FIG. 5A) or substantially that length of the holder 500, similar to holder 400, except as will be described. The holder 500 also preferably includes a protruding rectangular prism section 504 having a closed end 504a, and a closed end 504b. The section 504, in at least one embodiment, is solid or substantially solid.

The protrusion 504 has a flat bottom surface 504c, for contacting and being attached to the front windshield 2 of FIG. 1A. The flat bottom surface 504c may be removably attached to the front windshield, along the entire length L1 (as for holder 400) of the holder 500, or substantially the entire length, by glue, adhesive, tape, suction cups, or in any other known manner. The holder 500 is preferably oriented and attached to the front windshield in a manner so that the lght or light mechanism 550 shown in FIG. 6B does not fall out of the holder 500. Typically this means that the opening 502b should be higher than the closed end 502a. The holder has a width W1 (which may be the same or similar to that shown in FIG. 5A), which should be substantial enough to hold the holder 500 and inserted light 550 to the windshield 2, but not too great that a view is obstructed. A length L1 and a width W1, identical or similar to as previously discussed for holder 400 are preferred in at least one embodiment.

Figure 6B:
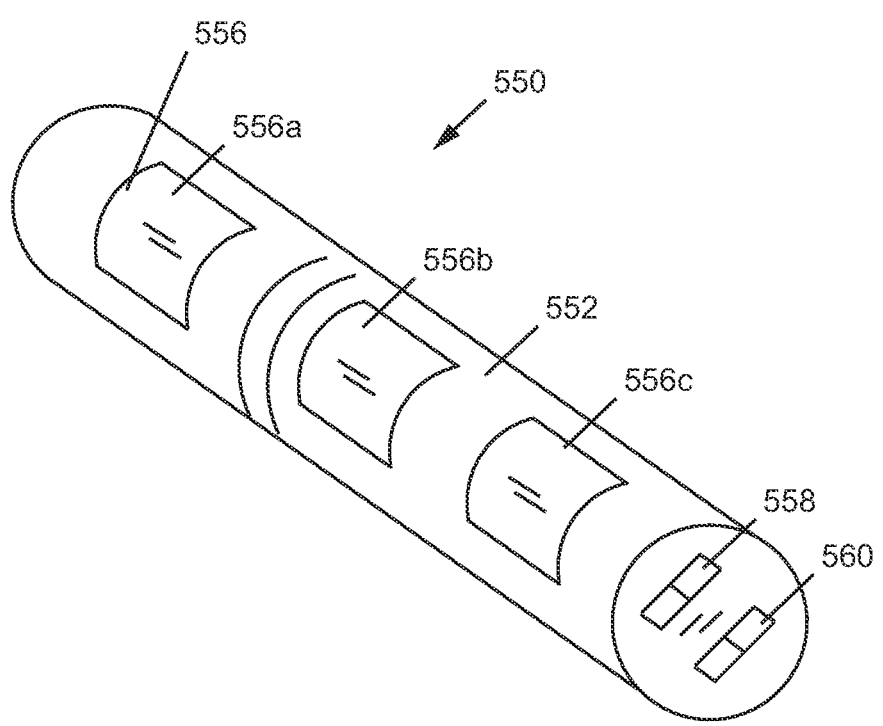
FIG. 6B, shows a front, left, and top perspective view of another light or light mechanism for insertion into the holder of FIG. 6A.

FIG. 6B, shows a front, left, and top perspective view of a light or light mechanism 550 for insertion into the holder 500 of FIG. 6A. The light mechanism 550 includes one or more lights, such as a plurality of lights 556, including light 556a, 556b, and 556c. The light mechanism 550 includes a cylindrical portion or substantially cylindrical portion or light housing 552 which is typically solid or substantially solid. The light mechanism 550 further includes a switch and/or mechanism 558 for setting brightness and turning the lights 556a, 556b, 556c on and off, and a switch and/or mechanism 560 for switching to one or multicolor lights. The light 556a may emit blue light. The light 556b may emit green light. The light 556c may emit white light. The switch or mechanism 560 may toggle through various light settings, such as any one, two or three, of lights 556a-c on while the others may be off.

Figure 6C:
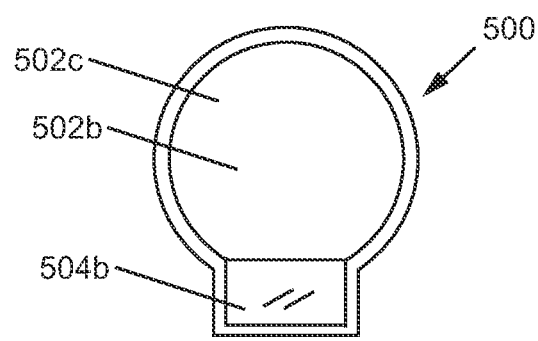
FIG. 6C shows a front view of the holder of FIG. 6A.

FIG. 6C shows a front view of the holder 500 of FIG. 6A.

Figure 6D:
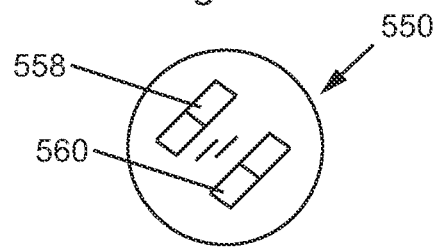
FIG. 6D shows a front view of the light or lighting mechanism of FIG. 6B.

FIG. 6D shows a front view of the light or lighting mechanism 550 of FIG. 6B.

Figure 6E:
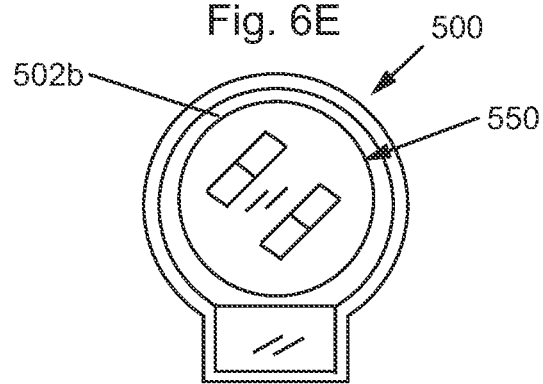
FIG. 6E shows a front view of the light or lighting mechanism of FIG. 6B inserted into the holder of FIG. 6A.

FIG. 6E shows a front view of the light or lighting mechanism 550 of FIG. 6B inserted into the holder 500 of FIG. 6A. The cylinder portion 552 is configured to mesh within the hollow inner cylinder chamber of inner chamber 502c, preferably for the entire or substantially the entire length L1 (similar or identical to L1 of holder 400) of the holder 500. Note that the lighting mechanism 550 is inserted into the holder 500, so that the switches 558 and 560 are accessible through the opening 502b.

Figure 7A:
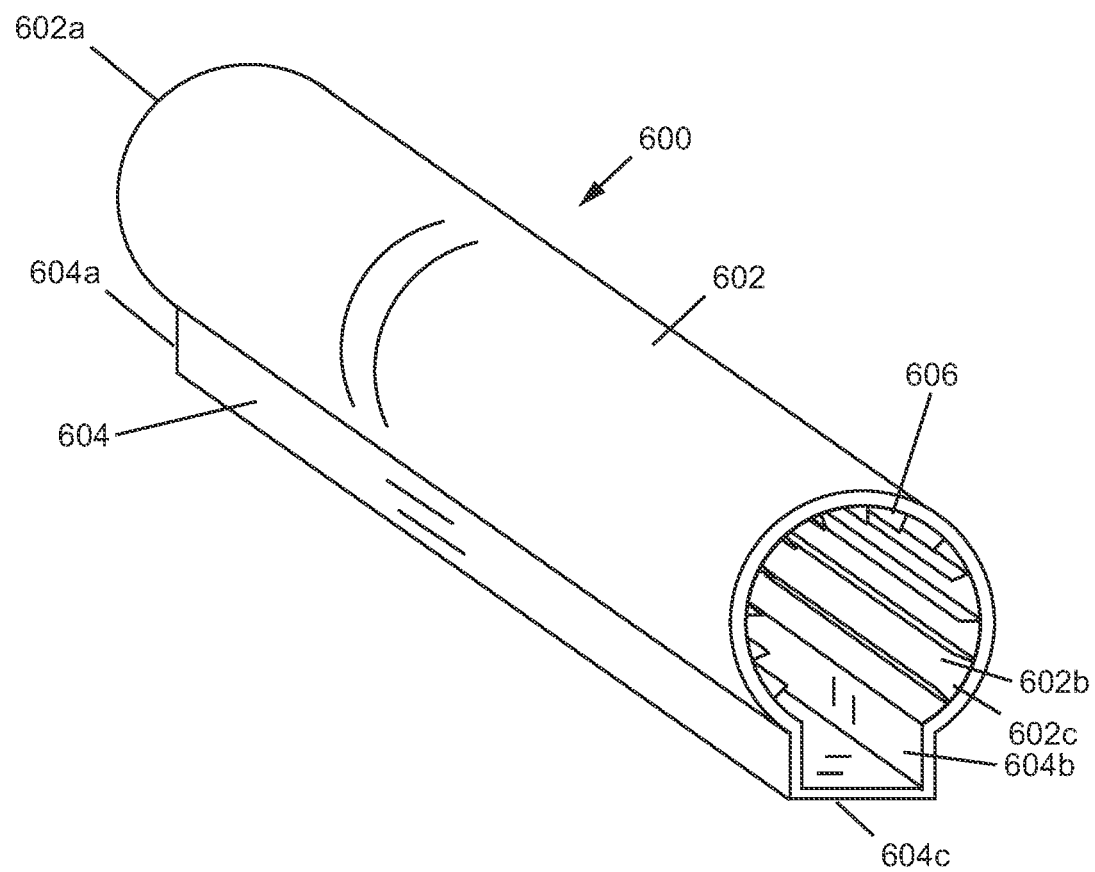
FIG. 7A shows a front, left, and top perspective view of yet another holder for the first device of FIG. 1A, the second device of FIG. 2A, or a similar or identical device, in accordance with an embodiment of the present invention.

FIG. 7A shows a front, left, and top perspective view of a holder 600 for the first device 10 of FIG. 1A, the second device 110 of FIG. 2A, or a similar or identical device, in accordance with an embodiment of the present invention.

The holder 600 may include a cylinder portion 602, which has a closed end 602a, and an opposite open end 602b. The open end 602b leads to an inner chamber 602c which typically runs the length L1 (similar or identical to L1 of FIG. 5A) or substantially that length of the holder 600. The holder 600 also preferably includes a protruding rectangular prism section 604 having a closed end 604a and an opposite open end 604b, which leads to the inner chamber 602c. The inner chamber 602c may be described as including both the hollow cylindrical portion and the hollow rectangular prism portion.

The protrusion 604 has a flat bottom surface 604c, for contacting and being attached to the front windshield 2 of FIG. 1A. The flat bottom surface 604c may be removably attached to the front windshield, along the entire length L1 of the holder 600 (similar or identical to holder 400 in FIG. 5A), or substantially the entire length, by glue, adhesive, tape, suction cups, or in any other known manner. The holder 600 is preferably oriented and attached to the front windshield 2 in a manner so that the lght or light mechanism 650 shown in FIG. 7B does not fall out of the holder 600. Typically this means that the opening 602b should be higher than the closed end 602a. The holder has a width W1 (similar or identical to W1 in FIG. 5A), which should be substantial enough to hold the holder 600 and inserted light 650 to the windshield 2, but not too great that a view is obstructed. A length L1 and a width W1, similar or identical to as discussed for holder 400, are preferred in at least one embodiment.

The holder 600 includes a plurality of inwardly projecting protrusions 606, which project into the inner chamber 602c and which are configured to mesh with outwardly projecting protrusions 662 of the lighting mechanism 650, to temporarily set an orientation for the lighting mechanism 650 with respect to the holder 600. The orientation, of lighting mechanism 650 with respect to the holder 600 (and therefore with respect to the front windshield 2 to which the holder 600 is attached), can be changed by taking the lighting mechanism 650 out of the holder 600 and then turning the lighting mechanism 650, such as in a clockwise C1 direction, shown in FIG. 7B (wherein the length of the lighting mechanism 650 remains oriented the same, i.e. parallel to the length of the holder 600, with the switches 658 and 660 still configured to be at the opening 602b, when the lighting mechanism 650 is inserted into the holder 600). The lighting mechanism 650 is then reinserted into the inner chamber 602c, and the meshing of the protrusions 606 of the holder 600 and the protrusions 662 of the lighting mechanism 650 hold the lighting mechanism 650 in an orientation with respect to the holder 600.

Figure 7B:
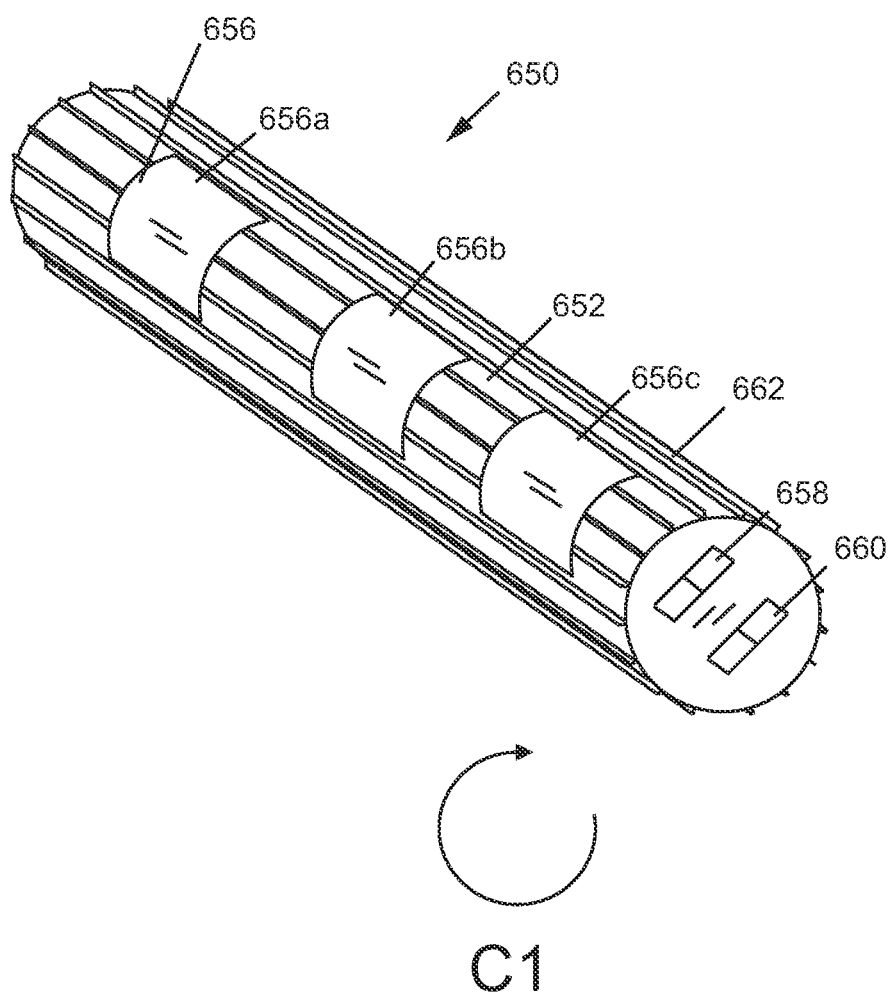
FIG. 7B, shows a front, left, and top perspective view of yet another light or light mechanism for insertion into the holder of FIG. 7A.

FIG. 7B, shows a front, left, and top perspective view of a light or light mechanism 650 for insertion into the holder 600 of FIG. 7A. The light mechanism 650 includes one or more lights, such as a plurality of lights 656, including light 656a, 656b, and 656c. The light mechanism 650 includes a cylindrical portion or substantially cylindrical portion or light housing 652, which may be typically solid or substantially solid. The light mechanism 650 further includes a switch and/or mechanism 658 for setting brightness and turning the lights 656a, 656b, 656c on and off, and a switch and/or mechanism 660 for switching to one or multicolor lights. The light 656a may emit blue light. The light 656b may emit green light. The light 656c may emit white light. The switch or mechanism 660 may toggle through various light settings, such as any one, two or three, of lights 656a-c on while the others may be off.

FIG. 7C shows a front view of the holder 600 of FIG. 7A.

FIG. 7D shows a front view of the light or lighting mechanism 650 of FIG. 7B.

FIG. 7E shows a front view of the light or lighting mechanism 650 of FIG. 7B inserted into the holder 600 of FIG. 7A. The cylinder portion 652 is configured to mesh within the hollow inner cylinder chamber of inner chamber 602c, and protrusions 606 of holder 600 and protrusions 662 of lighting mechanism 650 are configured to mesh preferably for the entire or substantially the entire length of the holder 600, and the meshing of the protrusions 606 and 662 maintains the light mechanism 650 in a specific orientation with respect to the holder 600, and therefore with respect to the windshield 2 when the holder 600 is attached to the windshield 2, as for device 10 in FIG. 1A and device 110 in FIG. 2A. Note that the lighting mechanism 650 is inserted into the holder 600, so that the switches 658 and 460 are accessible through the opening 602b.

In FIG. 7B, the ridges or protrusions 662 are preferably broken up or discontinued in areas where the lights 656a, 656b, and 656c are located so that the ridges or protrusions 662 do not block and/or are not directly in front of any of the lights 656a, 656b, and 656c.

Figure 8A:
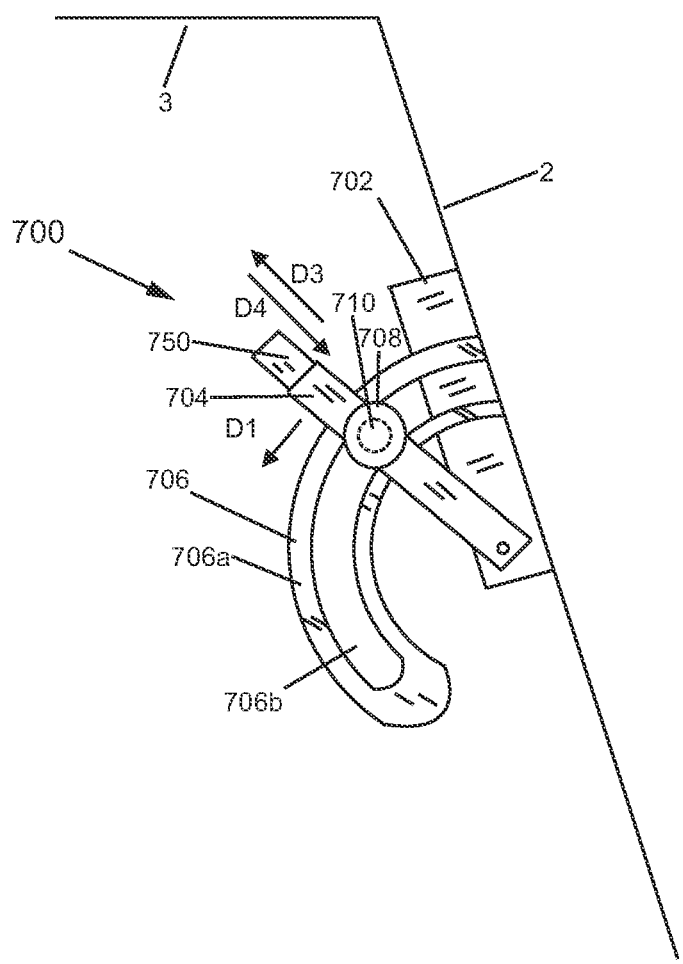

FIG. 8A shows an apparatus 700 including a device 702 configured to attach to a front windshield, which is attached to an arcuate track 706, through which a light and/or combination light and holder 704, such as the first device of FIG. 1A, the second device of FIG. 2A, and/or the devices of FIGS. 5A-E, 6A-E, and/or 7A-E, is able to rotate, pivot, and/or swivel, and/or move up and down inside the holder with respect to the device 702 configured to attach to the front windshield 2.

The device 702 may be removably attached to the windshield 2 in any known manner, such as by gluing, Velcro (trademarked) hooks and loops portions, tape, or suction cups.

Figure 8B:
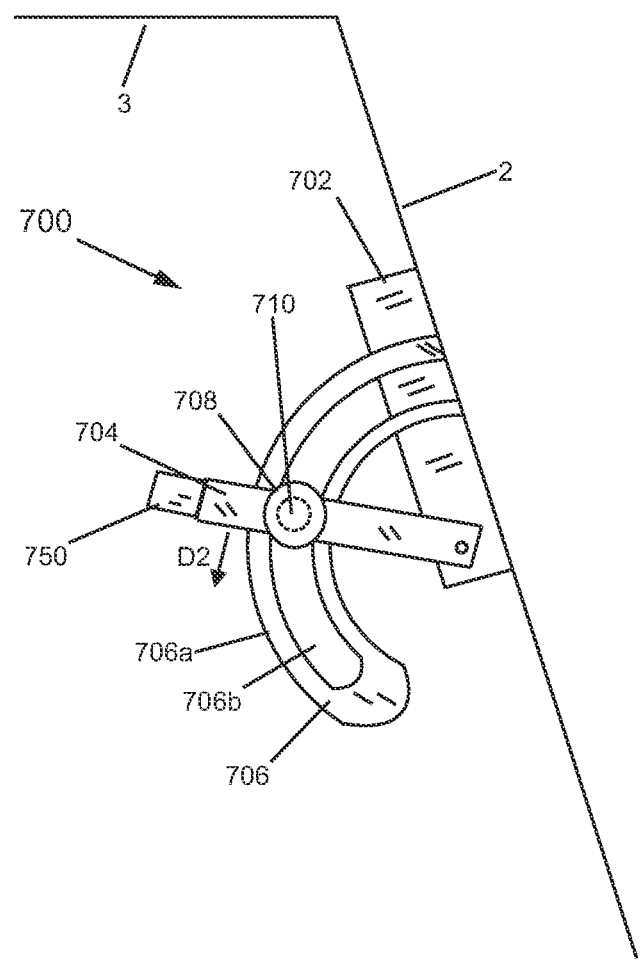

The lighting mechanism and/or holder 704 may include a pin 710 shown by dashed lines which is configured to move within a slot 706b of the arcuate track 706. The arcuate track 706 may have a solid portion 706a, in which the slot 706b is located. The mechanism and/or holder 704 may include a screw or device 708 which is configured to be turned to hold the mechanism and/or holder 704 at a specific orientation with respect to the device 702 and therefore with respect to the windshield 2. The mechanism and/or holder 704 projects light in a direction D1 in FIG. 8A. In FIG. 8B, the mechanism and/or holder 704 has been rotated, from the orientation of FIG. 8A, with respect to the device 702 and with respect to the windshield 2 so that the mechanism and/or holder 702 now projects light in a direction D2. FIGS. 8A and 8B also show roof 3 of the automobile or automobile section, which is typically parallel to a horizontal ground surface.

In operation, the screw or fastener 708 can be unscrewed to allow the mechanism and/or holder 704 to be adjusted in orientation with respect to the device 702 and with respect to the windshield 2. After the mechanism and/or holder 704 has been pivoted to the desired orientation with respect to the device 702, the screw 708 is configured to be tightened to temporarily keep holder 704 in the desired orientation with respect to the device 702. In addition, the screw 708 may be configured, or an additional screw may be provided to hold a light housing 750 in a position within the holder 704. The light housing 750 may be configured to slide up and down in the directions D3 or D4, respectively, further out of or into the housing 704, and the screw 708 may be used to maintain the light housing 750 at a specific position with respect to the housing 704. The light housing 750 may be any one of the light housings previously discussed, including any one or more of light housings 450, 550, 650, and/or 850, and the mechanism and/or holder 704 typically would be a type of holder that would mesh with and/or properly be configured with the type of light housing. Such as holders 400, 500, and 600 with light housings 450, 550, and 650, respectively.

Figure 9:
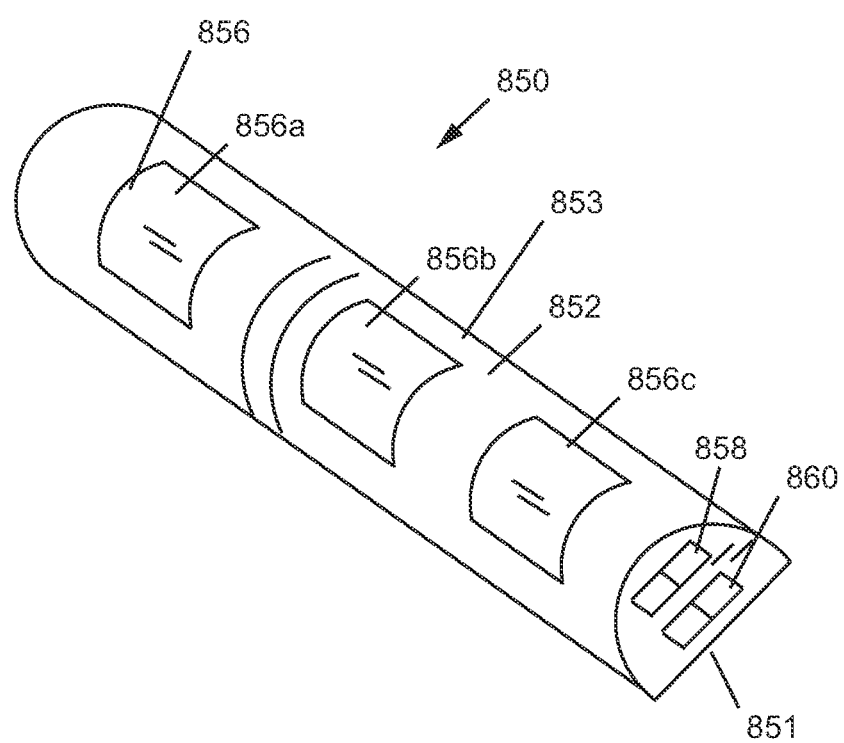
FIG. 9 shows a further lighting mechanism wherein the further lighting mechanism is configured to attach directly to a front windshield, and a column, frame or structural member immediately abutting and/or adjacent to the front windshield on the driver's side in accordance with an embodiment of the present invention from the perspective view of a driver looking out of a front windshield.

FIG. 9 shows a lighting mechanism 850 wherein the lighting mechanism 850 is configured to attach directly to a front windshield. In at least one embodiment, the light mechanism has a light housing 852 which may be approximately half of a cylinder, with a flat bottom surface 851, and a curved top surface 853, on which is located a plurality of lights 856 includes light 856a, 856b, and 856c. The lighting mechanism 850 may further include switches and/or level setting devices 858 and 860, which may be similar or identical to switches and/or level setting devices 458 and 460 of lighting mechanism 450 shown in FIG. 5A.

The lighting mechanism 850 may be similar or identical to lighting mechanism 550 shown in FIG. 6B, except as described above or below. Unlike lighting mechanism 550, the lighting mechanism has a flat bottom surface 851, for attaching directly to front windshield 2. The flat bottom surface 851 may include glue, adhesive, tape, suction cups, Velcro (trademarked) hooks and/or loops or any other known device for attaching the bottom surface 851 directly to the front windshield 2.

In one or more embodiments, an apparatus similar or identical to any one or more, of device 10 of FIGS. 1A-1B; device 110 of FIGS. 2A-B; devices 10 and 110 as configured in FIGS. 3A-3B; device 10 as configured on column in FIG. 4; apparatus 400 and device 450 of FIGS. 5A-E; apparatus 500 and device 550 of FIGS. 6A-6E, apparatus 600 and device 650 of FIGS. 7A-7E; apparatus 700 of FIGS. 8A-8B; and lighting mechanism 850 of FIG. 9 may be configured to be part of a vehicle, such as permanently part of the design of a vehicle, and produced by an original equipment manufacture (OEM) car manufacturer.

As shown by FIG. 4 or similar or identical to as shown in FIG. 4, the device 10 and/or 110, and/or any of devices or apparatuses 400, 450, 500, 550, 600, 650, 700, and/or 702 can be configured to be attached to a column, frame or structural member immediately abutting and/or adjacent to the front windshield on the driver's side in accordance with an embodiment of the present invention from the perspective view of a driver looking out of a front windshield. This can be done not only with a holder, but without a holder, such as directly attaching a light housing to a column, frame or other similar member as mentioned above.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a light housing;
a first light fixed to the light housing;
an attachment device configured to temporarily attach the light housing with the light to a front windshield of a vehicle; and
wherein the first light is fixed to the light housing in a manner so that light from the first light is projected outwards from the light housing in a visual field of less than one hundred and eighty degrees;
wherein the attachment device, is configured to attach the light housing to the front windshield so that the visual field of the first light does not project into either of both eyes of a driver of the vehicle;
wherein the attachment device includes a holder into which the housing with the first light are configured to be inserted;
wherein the holder is configured to mesh with the light housing so that when the light housing with the first light is inserted into the holder, and the first light is on, the first light projects outwards from the holder in a fixed direction with respect to the holder, wherein the fixed direction cannot be changed without removing the light housing with the first light from the holder or breaking the light housing, the first light, or the holder;
wherein the holder has a plurality of protrusions; and
the light housing has a plurality of protrusions which mesh with the plurality of protrusions of the holder in order to maintain the housing at a fixed orientation with respect to the holder while the light housing with the first light is in the holder.

2. The apparatus of claim 1 wherein
the light housing is substantially cylindrical.

3. The apparatus of claim 1 wherein
the light housing has a flat surface, configured to be attached and to abut the front windshield.

4. The apparatus of claim 1 wherein
a first mechanism is attached to the light housing;
and wherein the first mechanism is configured to set brightness of the first light.

5. The apparatus of claim 1 wherein
a first mechanism is attached to the light housing configured to turn the first light off and on.

6. The apparatus of claim 1 further comprising
a second light attached to the light housing; and
a third light attached to the light housing; and wherein each of the first, second, and third lights project light outwards from the light housing in substantially the same visual field.

7. An apparatus comprising:
a light housing;
a first light fixed to the light housing;
an attachment device configured to temporarily attach the light housing with the light to a front windshield of a vehicle; and
wherein the first light is fixed to the light housing in a manner so that light from the first light is projected outwards from the light housing in a visual field of less than one hundred and eighty degrees;
wherein the attachment device, is configured to attach the light housing to the front windshield so that the visual field of the first light does not project into either of both eyes of a driver of the vehicle; and wherein the attachment device includes a pivot pin which connects the attachment device to the light housing, so that the light housing is configured to pivot with respect to the attachment device, when the attachment device is attached to the front windshield of the vehicle.

8. A method comprising:

temporarily attaching a light housing to a front windshield of a vehicle using an attachment device; and wherein a first light is fixed to the light housing;

wherein the first light is fixed to the light housing in a manner so that light from the first light is projected outwards from the light housing in a visual field of less than one hundred and eighty degrees; and wherein the attachment device, is configured to attach the light housing to the front windshield so that the visual field of the first light does not project into either of both eyes of a driver of the vehicle;

wherein the attachment device includes a holder into which the housing with the first light are configured to be inserted;

wherein the holder is configured to mesh with the light housing so that when the light housing with the first light is inserted into the holder, and the first light is on, the first light projects outwards from the holder in a fixed direction with respect to the holder, wherein the fixed direction cannot be changed without removing the light housing with the first light from the holder or breaking the light housing, the first light, or the holder;

wherein the holder has a plurality of protrusions; and wherein the light housing has a plurality of protrusions which mesh with the plurality of protrusions of the holder in order to maintain the housing at a fixed orientation with respect to the holder while the light housing with the first light is in the holder.

9. The method of claim 8 wherein
the light housing is substantially cylindrical.

10. The method of claim 8 wherein
the light housing has a flat surface, configured to be attached and to abut the front windshield.

11. The method of claim 8 wherein
a first mechanism is attached to the light housing; and
wherein the first mechanism is configured to set the brightness of the first light.

12. The method of claim 8 wherein
a first mechanism is attached to the light housing configured to turn the first light off and on.

13. The method of claim 8 wherein
a second light is attached to the light housing;
wherein a third light is attached to the light housing;
wherein each of the first, second, and third lights project light outwards from the light housing in substantially the same visual field.

14. A method comprising:
temporarily attaching a light housing to a front windshield of a vehicle using an attachment device; and
wherein a first light is fixed to the light housing;
wherein the first light is fixed to the light housing in a manner so that light from the first light is projected outwards from the light housing in a visual field of less than one hundred and eighty degrees; and
wherein the attachment device, is configured to attach the light housing to the front windshield so that the visual field of the first light does not project into either of both eyes of a driver of the vehicle; and
wherein the attachment device includes a pivot pin which connects the attachment device to the light housing, so that the light housing is configured to pivot with respect to the attachment device, when the attachment device is attached to the front windshield of the vehicle.

* * * * *